March 4, 1958  J. F. STEPHENS  2,825,389
PROCESS OF MAKING A MAT OR FELTED STRUCTURE
Original Filed Nov. 23, 1949
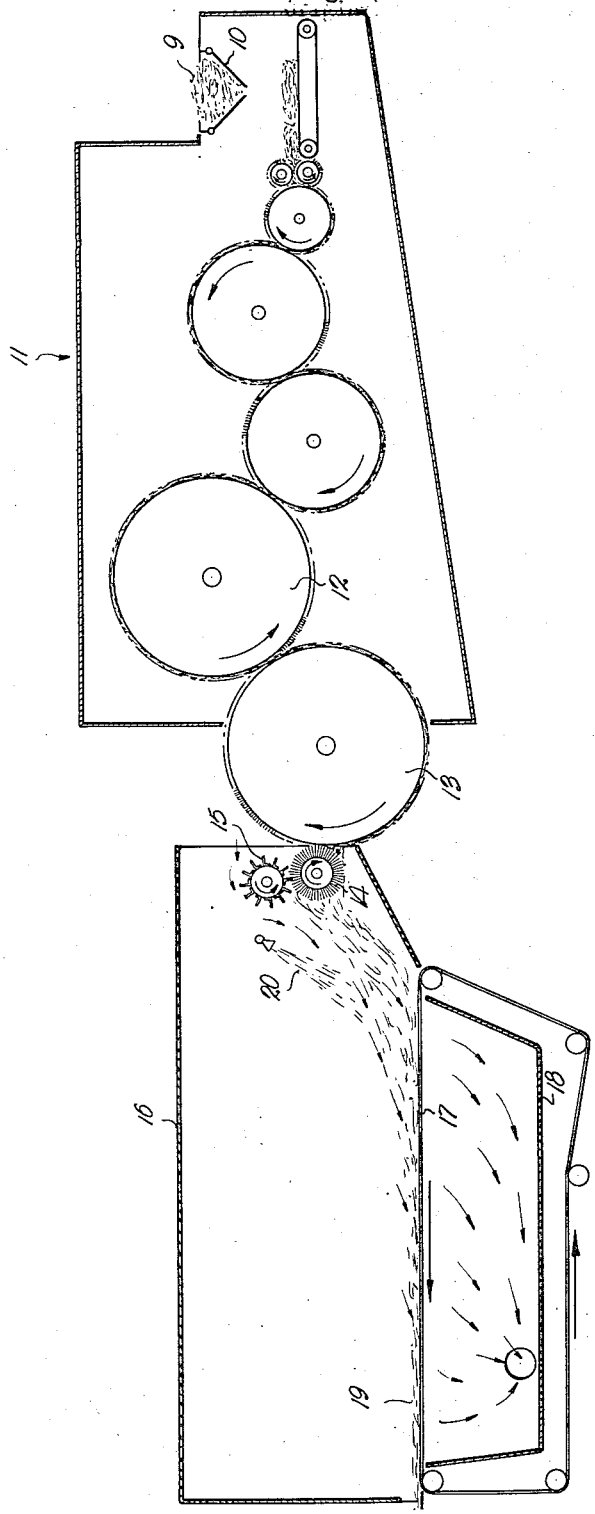
INVENTOR.
Joseph F. Stephens
BY Thos. C. Scofield
ATTORNEY.

United States Patent Office 2,825,389
Patented Mar. 4, 1958

2,825,389

PROCESS OF MAKING A MAT OR FELTED STRUCTURE

Joseph F. Stephens, Kansas City, Mo., assignor to Gustin-Bacon Manufacturing Company, a corporation of Missouri Original application November 23, 1949, Serial No. 129,167, now Patent No. 2,695,855, dated November 30, 1954. Divided and this application May 21, 1954, Serial No. 431,609

10 Claims. (Cl. 154—28)

This invention relates to an improvement in acoustical and heat insulating bonded mats or felts used as thermal or acoustical insulating material and the method of making same, and refers more particularly to a felted fibrous structure into which is incorporated a rubber-like elastic material in combination with a thermoplastic or thermosetting resinous material. The fibers and the elastic material are bonded together by the resinous material, and the mat or felt is manufactured in a continuous operation by depositing the fibers, elastic material, and binder upon a conveyor where a mat is formed by flowing and hardening or curing the resinous binder material through the application of heat.

The present application is a division of my copending application Serial No. 129,167, filed November 23, 1949, now Patent No. 2,695,855, issued November 30, 1954.

A mat having the structure contemplated has improved characteristics over material now employed for the purpose, is economical to manufacture, has extensive uses as thermal or acoustical insulation and as padding or upholstering material. For example, in the modern automobile it may be used in the dash panel for the purpose of insulating against both the heat and sound of the engine; it may be used as a sound and heat insulation under the rubber floor mats, as a top liner for sound absorption, for lining air intake ducts, and in the fabrication of shroud sides.

An object of the invention is to provide a mat structure which is effective as a heat and sound insulating material which possesses unusual properties of resilience and which has a high degree of integrity or strength.

Another object is to provide a mat in which are incorporated carrier and filler fibers of organic or inorganic nature or a mixture of the two in combination with an elastic material and bonded with a thermoplastic or thermosetting resin into a resilient pad which is easily shaped and sufficiently flexible to fit irregular surfaces.

A further object is to provide a felted structure which is economical to manufacture and effective in meeting the requirements for which it is utilized.

In the accompanying drawing, the single figure represents schematically the method embodying the present invention.

In the manufacture of this material from organic or inorganic fibers or a combination of the two, the fibers or filaments are first prepared by chopping or cutting to the desired length, if they are not of the proper length as supplied. Selected quantities and types of fibers are then appropriately blended, the blend consisting in some part of longer length carrier fibers and in greater part of shorter length filler fibers.

The reason for using carrier fibers and filler fibers in the blend is that in order to make use of the cheaper filler fibers, it is necessary to blend therewith a sufficient percentage of the longer carrier fiber to have the blend or mixture successfully carry through textile equipment such as garnetts. If all short filler fibers or too high a percentage thereof are utilized, the result is the loss of an objectionable amount in the form of droppings in the garnett operation. These longer carrier fibers are also used to impart strength to the finished product.

The blend 9 of carrier and filler fibers is fed to the hopper 10 of a hopper type garnett feeder, then processed through the garnett 11, from the final cylinder 12 of which it is stripped off by a doffer roll 13. The doffer roll is in turn stripped of the fibers by a brush roll 14, which is in turn stripped by a beater or wind roll 15 or by air air stream which propels the fibers forward from the garnett. A suitable form of apparatus for doing this is disclosed in Hubert O. Sheidley application Serial No. 210,544, filed February 12, 1951 now Patent No. 2,619,151, issued November 25, 1952.

The fibers are carried by the air stream into a hood or settling chamber 16, which is open on the side from which the fibers are fed and closed on all other sides except the bottom which is comprised of a foraminous conveyor belt 17 positioned over a vacuum box 18. A partial vacuum is pulled through the foraminous belt causing the fibers to be attracted to and to lay up on the upper face of the foraminous belt in the form of a mat or felt as the belt moves through the hood. The vacuum also serves to exhaust the air which transports the fiber into the hood. Suction from the foraminous belt builds up the fibers in the form of a felted mat 19 on the surface of the moving belt conveyor. This arrangement also is shown in the aforementioned Sheidley application.

According to the present invention, in the vicinity of the garnett stripping mechanism (which comprises the brush and beater rolls previously mentioned) and between the garnett and the foraminous belt, a powdered thermosetting or thermoplastic resin is introduced by feeding the resin into a separate air stream as at 20 and merging such air stream with the air stream which is transporting the fibers. With such powdered thermosetting or thermoplastic resin, there is mixed a desirable proportion of powdered rubber, either in the vulcanized or unvulcanized state, so that there is airborne into the hood or settling chamber and deposited on the foraminous belt, a combination of fibers, powdered resin, and powdered elastic material, the powdered material being intimately interspersed throughout the felted web.

Instead of airborne powder resin, a wet spray may be used in which the resin is in the form of either a solution or dispersion and to which rubber has been added in the form of a rubber latex or solution. In such use the wet resin and rubber is sprayed into the air stream carrying the fibers, thus coating and intimately comingling with the fibers prior to their deposition and accumulation on the conveyor belt.

It is also contemplated that the rubber may be added in the form of a rubber latex or solution to the fiber and dried on the surface of the fiber before such fiber is fed to the garnett. In such case only the thermosetting or thermoplastic resin is introduced in dry or wet state between the garnett and the foraminous belt upon which the mat is formed.

In place of incorporating powdered rubber or of pretreating the fiber with rubber, fiber or fiber threads which contain such rubber on the surface or interspersed throughout the mass in small discrete particles or both may be utilized. An example of such fiber is that which is reclaimed from the carcass of automotive tires, which fibers have been reclaimed therefrom through special reclaiming methods, removing the cord from the rubber tire body in a form known to the trade as "reclaimed tire cord." Within the fibers composing such cord and on the surface thereof is to be found the requisite rubber for the product described without further processing thereof or without adding additional rubber.

After the carrier and filler fibers have been combined with the elastic material and resinous binder and the composition deposited in the form of a mat structure on the conveyor belt, the mat or felt moves thereon to a point of transfer to a steel flight conveyor, which passes through a curing or drying oven of conventional design and well known to the art. Such oven conveyor has positioned thereabove a second conveyor also passing through the oven, the flights of which are in parallel plane to those of the conveyor on which the mat is carried. The oven conveyors are adjustable with respect to each other so the space between their flights may be varied to govern and control the thickness and density of the mat. In other words, by regulating the distance between the flights of the respective conveyors, it is possible to compress the mat structure to any desired degree during the period it is in a formative state or while in transit through the oven.

In the oven the mat is exposed to sufficient heat, when a thermoplastic binder is used, to cause it to soften and flow. When a thermosetting binder is employed, the heat of the oven is regulated to cure the binder during its passage through the oven to a degree that the fibers of the mat are bonded into an integral structure. Methods of oven drying and curing thermoplastic and thermosetting binders are well known to the art.

In order to produce the desired properties in the resultant composition or felted mat, it is necessary that the elastic material, rubber or an equivalent elastomer, be used in combination with a thermoplastic or thermosetting resin or binder. The product is characterized by better adhesion between the carrier and filler fibers composing the mat and by a marked increase in its resilient properties.

Examples of fibers or filaments adaptable as carrier fibers are long staple cotton, cotton clearer waste (a form of mill waste obtained as a waste material in clearing or cleaning carding machines in the processing of long staple cotton), rayon, nylon, or other synthetic fiber, filaments, yarns, or threads, chopped or cut to the desired length, cotton yarns or threads obtained by opening and chopping, cotton garment cloth such as garment clips or thread waste having the requisite length or filament or thread. This carrier fiber or thread stock is characterized by lengths ranging predominantly between ¾" to 3", although a small percentage of shorter material may be present, as the necessary consequence of methods used to cut or chop the fiber to the desired lengths.

Examples of the filler fiber are cotton linters, cotton napper (recovered from napping operation in the manufacture of cotton blankets and the like) and reclaimed tire cord. The fill fiber is characterized by lengths predominantly less than ¾".

In composing a blend or mixture to form the mat, a minimum of 25% carrier fiber is used with a maximum of 75% fill fiber and a minimum of 10% of total binder material by weight is utilized, of which not less than one-third is of the rubber or elastomer type.

Four of the most successful mats or felts are processed from blends of the recited materials in the proportions indicated in the following examples:

*Example I*

60 lbs. of reclaimed tire cord having a percentage of vulcanized rubber of not less than 10% nor more than 30%, making a composition of 70% to 90% of cotton and 10% to 30% of rubber.

40 lbs. long staple cotton in the form of clearer waste.
20 lbs. powdered phenol formaldehyde resin.

*Example II*

60 lbs. reclaimed tire cord as in Example I.
20 lbs. long staple clearer waste.
20 lbs. of chopped or cut rayon filament or thread stock 1½" average length.
20 lbs. powdered phenol formaldehyde resin.

*Example III*

50 lbs. cotton napper.
40 lbs. chopped or cut cotton or rayon thread stock or rayon filament of an average length of 1½" and ranging in length from ¾" to 3".
10 lbs. powdered natural or synthetic rubber, or 10 lbs. of rubber solids in the form of a sprayed emulsion.
20 lbs. of vinyl chloride acetate resin, or 20 lbs. of the same resin in the form of solids in a solution or dispersion.

*Example IV*

50 lbs. cotton napper or cotton linters.
30 lbs. glass filament or glass yarn chopped to an average length of 1½".
20 lbs. phenol formaldehyde resin.
10 lbs. powdered natural or synthetic rubber, or 10 lbs. rubber solids in the form of a sprayed emulsion.

In the processing of the material in the forming section or hood where the fibers, rubber, and binder are combined, and in the heating of the material in the oven, some part of the binder material contained in the blend is necessarily lost to the vacuum and in the form of volatiles which are discharged through the stack.

Typical compositions of finished products contemplated herein and as manufactured are as follows:

| 1 | Percent |
|---|---|
| Organic fiber (cotton, rayon, nylon wool, etc.) | 56 to 89 |
| Synthetic resin (thermoplastic or thermosetting) | 8 to 24 |
| Rubber (natural or synthetic rubber or equivalent elastomer) | 3 to 20 |

| 2 | |
|---|---|
| Organic fiber (cotton, rayon, nylon, wool, etc.) | 21 to 46 |
| Mineral carrier fiber (glass filament or glass yarn cut or chopped to an average length of 1½" with lengths ranging from ¼" to 3") | 10 to 35 |
| Thermoplastic or thermosetting synthetic resins | 8 to 24 |
| Natural or synthetic rubber or equivalent elastomer | 3 to 20 |

The upper part of the range or resin and rubber content is utilized in fiber blends which contain high percentages of filler fiber and the lower part of the range of resin and rubber content is used with blends which contain the higher percentage of carrier fiber.

Thus it will be seen that there has been produced a mat or felted structure of fibers intimately combined with an elastic material and a resinous binder to produce an integral insulating pad. This mat or pad is bonded into a rugged, resilient composition economically manufactured from principally waste material at a low cost and effective for innumerable uses to insulate against heat, sound and like purposes.

From the foregoing it will be seen that this invention is one well adapted to attain all of the ends and objectives hereinabove set forth, together with other advantages which are obvious and which are inherent to the invention.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

In the appended claims the term "rubber-like elastic material" should be understood as meaning materials or mixtures of materials characterized by the properties of rubberiness and elasticity manifest by natural rubber; the term thus embraces natural rubber and also lastics (e. g., synthetic rubber) which are usable in lieu of, or in combination with, natural rubber and exhibit like characteristics when so used.

Having thus described my invention, I claim:

1. The method of making fibrous mat comprising the steps of mixing carrier fibers and fill fibers to form a fiber mixture of such proportions that the fill fibers constitute 50% to 75% of the mixture, the fill fibers being predominantly of a length less than half the average length of the carrier fibers, carding said fiber mixture, introducing the carded fibers into an air stream and transporting them solely by said air stream for an appreciable distance, directing said air stream through a foraminous barrier to cause the fibers to pile up against said barrier in haphazard jackstraw fashion to form a mat, and translating said barrier in a direction to carry the mat out of said air stream.

2. The method of making a fibrous mat, comprising the steps of mixing carrier fibers and fill fibers in such proportions that the latter form 50% to 75% of the mixture, the fill fibers being predominantly of a length less than half the average length of the carrier fibers, carding said fiber mixture, introducing the carded fibers into an air stream and transporting them solely by said air stream for an appreciable distance, introducing particles of a binder material into the same air stream so they co-mingle with the fibers as the latter are air-borne thereby, then directing said air stream through a foraminous barrier to cause the fibers to pile up against said barrier in haphazard jackstraw fashion to form a mat containing at least part of the binder particles, translating said barrier in a direction to carry the mat out of said air stream, and then curing the binder contained in said mat to secure the fibers together.

3. The method of making fibrous mat, comprising the steps of coating fibers with a rubber-like elastic material distinct from the fibers, carding the coated fibers, introducing the carded fibers into an air stream and transporting them solely by said air stream for an appreciable distance, introducing particles of a binder material into the same air stream so they co-mingle with the fibers as the latter are air-borne thereby, then directing said air stream through a foraminous barrier to cause the fibers to pile up against said barrier in haphazard jackstraw fashion to form a mat which in turn serves to trap at least part of the binder particles, translating said barrier in a direction to carry the mat out of said air stream, and then curing the binder trapped in said mat to secure the fibers together.

4. The method of making fibrous mat comprising the steps of coating fibers with a rubber-like elastic material distinct from the fibers, mixing uncoated fibers with the coated fibers in such proportions that the rubber-like material comprises 3% to 20% by weight of the mixture, carding the fiber mixture, introducing the carded fibers into an air stream and transporting them solely by said air stream for an appreciable distance, introducing a binder into the same air-stream so it co-mingles with the fibers as they are air-borne thereby, then diverting said air stream through a foraminous barrier to cause the fibers to pile up against said barrier in haphazard jackstraw fashion to form a mat, translating the barrier in a direction to carry the mat out of said air stream, and then curing the binder deposited on the fibers in said mat to secure the fibers together.

5. The method of making fibrous mat comprising the steps of impregnating fibers with a rubber-like elastic material distinct from the fibers, mixing the impregnated fibers with unimpregnated fibers in such proportions that the rubber-like material comprises 3% to 20% by weight of the mixture, carding the fiber mixture, introducing the carded fibers into an air stream and transporting them solely by said air stream for an appreciable distance, introducing a binder into the same air stream so it co-mingles with the fibers as they are air-borne thereby, then directing said air stream through a foraminous barrier to cause the fibers to pile up against said barrier in haphazard jackstraw fashion to form a mat, translating said barrier in a direction to carry the mat out of said air stream, and then curing the binder deposited on the fibers in said mat to secure the fibers together.

6. The method of making fibrous mat comprising the steps of coating fibers with a rubber-like elastic material distinct from the fibers, mixing said coated fibers with uncoated fibers predominantly of a length at least double the average length of the coated fibers, carding said fiber mixture, introducing the carded fibers into an air stream and transporting them solely by said air stream for an appreciable distance, introducing a binder into the same air stream so it co-mingles with the fibers as they are air-borne thereby, then directing the air stream through a foraminous barrier to cause the fibers to pile up against said barrier in haphazard jackstraw fashion to form a mat, translating said barrier in a direction to carry the mat out of said air stream, and then curing the binder deposited on the fibers in said mat to secure the fibers together.

7. A method as in claim 6 wherein said coated and uncoated fibers are mixed in such proportions that the latter comprise 25% to 50% of the mixture.

8. The method of making fibrous mat comprising the steps of impregnating fibers with a rubber-like elastic material distinct from the fibers, mixing the impregnated fibers with unimpregnated fibers predominantly of a length at least double the average length of the impregnated fibers, carding said fiber mixture, introducing the carded fibers into an air stream and transporting them solely by said air stream for an appreciable distance, introducing a binder into the same air stream so it co-mingles with the fibers as they are air-borne thereby, then directing said air stream through a foraminous barrier to cause the fibers to pile up against said barrier in haphazard jackstraw fashion to form a mat, translating said barrier in a direction to carry the mat out of said air stream, and then curing the binder deposited on the fibers in said mat to secure the fibers together.

9. The method of making a fibrous mat comprising the steps of mixing carrier fibers and fill fibers in such proportions that the latter form 50% to 75% of the mixture, the fill fibers being predominantly of a length less than half the average length of the carrier fibers, carding said fiber mixture, introducing the carded fibers into an air stream and transporting them solely by said air stream for an appreciable distance, introducing particles of a binder material and particles of a rubber-like elastic material distinct from said binder into said air stream so they co-mingle with the fibers as the latter are air-borne thereby, then directing said air stream through a foraminous barrier to cause the fibers to pile up against said barrier in haphazard jackstraw fashion to form a mat, translating said barrier in a direction to carry the mat out of said air stream, and then curing the binder deposited in said mat by the air stream to secure the fibers and particles of rubber-like elastic material together.

10. The method of making a fibrous mat comprising the steps of carding the fibers, introducing the carded fibers into an air stream and transporting them solely by said air stream for an appreciable distance, introducing particles of a binder material and particles of a rubber-like elastic material distinct from said binder into said air stream so they co-mingle with the fibers as the latter are air-borne by the air stream, then directing said air stream through a foraminous barrier to cause the fibers to pile up against said barrier in haphazard jackstraw fashion to form a mat which serves in turn to trap at least part of said particles, translating said barrier in a direction to carry the mat out of said air stream, and then curing the binder trapped in said mat to secure together the fibers and particles of rubber-like elastic material.

References Cited in the file of this patent

UNITED STATES PATENTS

| | | |
|---|---|---|
| 1,765,026 | Miller | June 17, 1930 |
| 2,370,365 | Magill | Feb. 27, 1945 |
| 2,398,159 | Riehl | Apr. 9, 1946 |
| 2,477,675 | Wilson et al. | Aug. 2, 1949 |
| 2,589,008 | Lannan | Mar. 11, 1952 |
| 2,639,759 | Simison | May 26, 1953 |
| 2,695,855 | Stephens | Nov. 30, 1954 |